United States Patent
Bengtsson et al.

(10) Patent No.: US 10,581,494 B2
(45) Date of Patent: Mar. 3, 2020

(54) BASE STATION AND OPERATING METHOD THEREOF

(71) Applicant: Sony Mobile Communications Inc., Tokyo (JP)

(72) Inventors: Erik Bengtsson, Eslöv (SE); Olof Zander, Södra Sandby (SE)

(73) Assignee: SONY CORPORATION, Tokyo (JP)

( * ) Notice: Subject to any disclaimer, the term of this patent is extended or adjusted under 35 U.S.C. 154(b) by 9 days.

(21) Appl. No.: 15/651,000

(22) Filed: Jul. 17, 2017

(65) Prior Publication Data
US 2018/0054239 A1 Feb. 22, 2018

(30) Foreign Application Priority Data
Aug. 16, 2016 (EP) ..................................... 16184391

(51) Int. Cl.
*H04B 1/38* (2015.01)
*H04B 7/0413* (2017.01)
(Continued)

(52) U.S. Cl.
CPC ............. *H04B 7/0413* (2013.01); *H04B 1/00* (2013.01); *H04B 1/18* (2013.01); *H04B 7/0469* (2013.01);
(Continued)

(58) Field of Classification Search
CPC ......... H04W 72/0413; H04W 28/0268; H04W 72/046
(Continued)

(56) References Cited

U.S. PATENT DOCUMENTS

2012/0243638 A1\* 9/2012 Maltsev ............ H04W 72/0453
 375/316
2013/0051342 A1\* 2/2013 Aiba ..................... H04L 1/1893
 370/329
(Continued)

FOREIGN PATENT DOCUMENTS

WO 2013/115708 A2 8/2013
WO 2015/188896 A1 12/2015

OTHER PUBLICATIONS

European Search Report from counterpart European Application No. 16184391.7, dated Jan. 31, 2017.
(Continued)

*Primary Examiner* — Tu X Nguyen
(74) *Attorney, Agent, or Firm* — Tucker Ellis LLP

(57) ABSTRACT

A base station, e.g., for massive MIMO, has channel receivers, each connected to a respective antenna among a plurality of antennas to receive an RF transmission signal generated by a communication device (CD). Each channel receiver has a channel front-end module, which has a first bandwidth and converts the RF transmission signal into one or more first analog baseband signals. The channel receivers are collectively operable to define a spatial beam focus at the CD, based on channel state information of the CD. The base station has pilot signal receivers, each connected to a respective antenna among the plurality of antennas to receive an RF pilot signal generated by the CD or another CD. Each pilot signal receiver has a pilot signal front-end module, which has a second bandwidth that is smaller than the first bandwidth and converts the RF pilot signal into one or more second analog baseband signals.

15 Claims, 2 Drawing Sheets

(51) Int. Cl.
  *H04B 1/00* (2006.01)
  *H04B 1/18* (2006.01)
  *H04B 7/0456* (2017.01)
  *H04B 7/06* (2006.01)
  *H04L 1/06* (2006.01)
  *H04B 7/10* (2017.01)

(52) U.S. Cl.
  CPC ......... *H04B 7/0626* (2013.01); *H04L 1/0625* (2013.01); *H04B 7/0669* (2013.01); *H04B 7/0673* (2013.01); *H04B 7/10* (2013.01)

(58) Field of Classification Search
  USPC .............................. 455/19, 25, 15, 509, 561
  See application file for complete search history.

(56) References Cited

U.S. PATENT DOCUMENTS

| | | | |
|---|---|---|---|
| 2015/0373746 A1 | 12/2015 | Bengtsson | |
| 2016/0094318 A1* | 3/2016 | Shattil | H04B 7/026 375/267 |
| 2016/0142922 A1* | 5/2016 | Chen | H04B 7/0695 375/267 |

OTHER PUBLICATIONS

Björnson, Emil et al., "Massive MIMO: Ten Myths and One Critical Question", published in IEEE Communications Magazine, vol. 54, No. 2, pp. 114-123, Feb. 2016.
Larsson, Erik G. et al, "Massive MIMO for next generation wireless systems", published in IEEE Communications Magazine, vol. 52, No. 2, pp. 186-195, Feb. 2014.

\* cited by examiner

BASE STATION AND OPERATING METHOD THEREOF

RELATED APPLICATION DATA

This applications claims the benefit of European Patent Application No. 16184391, filed Aug. 16, 2016, the disclosure of which is incorporated herein by reference in its entirety.

TECHNICAL FIELD

The present disclosure relates generally to systems for wireless communication, in particular Massive Multiple-Input Multiple-Output (MIMO) communication.

BACKGROUND ART

MIMO technology relies on multiple antennas to simultaneously transmit multiple streams of data in wireless communication systems. For example, MIMO is incorporated into recent and evolving wireless broadband standards such as 4G LTE and LTE-A, and allows a base station to communicate with several mobile terminals. The most modern standard, LTE-A, allows for up to 8 antenna ports at the base station.

Massive MIMO is an emerging technology that scales up MIMO, typically by orders of magnitude. Massive MIMO is sometimes abbreviated MaMi and is also known as "Large-Scale Antenna Systems", "Very Large MIMO", "Hyper MIMO", "Full-Dimension MIMO" and "ARGOS". Massive MIMO is a multi-user MIMO technology proposed for use in base stations for wireless communication, where each base station is equipped with an array of M active antenna elements, so-called service antennas, and utilizes these to communicate with K (single- or plural-antenna) terminals, over the same time and frequency band. The number M of service antennas may be at least 10, but is typically much larger, such as at least 20, 100 or 250. By coherent processing of the signals over the array, so-called transmit precoding may be used in the downlink to spatially focus each signal at its desired terminal, and so-called receive combining may be used in the uplink to discriminate between signals sent from different terminals. The more antennas that are used at the base station, the finer the spatial focusing to the terminals can be achieved. The spatial focusing enables use of a lower RF transmission power at both the base station and the terminals, without compromising signal-to-noise ratio (SNR). Massive MIMO is e.g. described in the articles "Massive MIMO: Ten Myths and One Critical Question", by Bjornson et al, published in IEEE Communications Magazine, vol. 54, no. 2, pp. 114-123, February 2016, and "Massive MIMO for next generation wireless systems", by Larsson et al, published in IEEE Communications Magazine, vol. 52, no. 2, pp. 186-195, February 2014.

The precoding and combining performed by a Massive MIMO base station rely on estimated channel responses to and from each of the terminals, denoted channel state information (CSI), and improve the effective SNR by a factor, denoted array gain, which is proportional to the number M and the quality of the CSI. Generally, the CSI may be different at the base station (uplink CSI) and the respective terminal (downlink CSI). The base station may obtain the uplink CSI by receiving and analyzing uplink pilots transmitted by the respective terminal. If the communication system is designed for TDD (time-division-duplex) operation, in which the same frequency bands are used for uplink and downlink, the downlink CSI will be equal to or at least approximate the uplink CSI, a phenomenon denoted "channel reciprocity". Thus, the base station may rely on this channel reciprocity to use the uplink CSI for downlink precoding purposes, optionally after applying calibration coefficients that e.g. account for non-reciprocity in the transceiver radio frequency (RF) chains at both ends of the link. If the communication system is designed for FDD (frequency-division-duplex) operation, in which different frequency bands are used for uplink and downlink, the downlink CSI may be determined by the respective terminal, e.g. based on training signals transmitted by the base station, and transmitted back to the base station.

In both TDD and FDD, the base station is configured to communicate with the terminals on one or more channels with a predefined bandwidth. Thus, the base station comprises a dedicated RF receiver for each antenna, where the RF receiver is configured to select a desired channel to be translated to digital baseband.

As understood from the foregoing, the desirable array gain is only achieved when the base station has determined the uplink CSI based on the uplink pilots transmitted by the respective terminal. Thus, the base station needs to be able to receive the uplink pilots that are transmitted by a terminal without the use of the array gain. This could be achieved by the terminal using an increased transmission power for the uplink pilots. However, this approach of generating the uplink pilots has the drawback of increasing the power consumption at the terminal and adding requirements to the terminal HW.

Although the foregoing discussion has focused on terminals, such as mobile handsets, it is equally applicable to other communication devices, which may be either mobile or stationary. One particular application environment for Massive MIMO base stations may be the Internet of Things (IoT), in which all types of devices are integrated with the Internet. Such IoT devices with wireless communication capability include various types of sensors and controllers. Many of these IoT devices are low-complexity devices, e.g. embedded devices with limited CPU, memory and power resources. It is realized that the above-mentioned approach of ensuring that uplink pilots reach the base station is generally unsuitable for IoT devices with limited power resources.

BRIEF SUMMARY

It is an objective of the invention to at least partly overcome one or more limitations of the prior art.

Another objective is to improve systems for wireless Massive MIMO communication.

A further objective is to improve the ability of a base station to connect to communication devices at lower pilot power levels.

A still further objective is to enable a reduced power consumption of communication devices in systems for wireless Massive MIMO communication.

One or more of these objectives, as well as further objectives that may appear from the description below, are at least partly achieved by a base station and a method of operating a base station according to the independent claims, embodiments thereof being defined by the dependent claims.

A first aspect of the invention is a base station, which may but need not be configured for massive MIMO communication. The base station comprises a plurality of antennas and a plurality of channel receivers. Each channel receiver is connected to a respective antenna among the plurality of antennas to wirelessly receive an RF transmission signal generated by a communication device, and each channel receiver comprises a channel front-end module, which has a first bandwidth and is configured to convert the RF transmission signal into one or more first analog baseband signals, wherein the channel receivers are collectively operable to define a spatial beam focus at the communication device, based on channel state information associated with the communication device. The base station further comprises a plurality of pilot signal receivers, wherein each pilot signal receiver is connected to a respective antenna among the plurality of antennas to wirelessly receive an RF pilot signal generated by the communication device or a further communication device. Each pilot signal receiver comprises a pilot signal front-end module, which has a second bandwidth that is smaller than the first bandwidth and which is configured to convert the RF pilot signal into one or more second analog baseband signals.

Thus, according to the first aspect, the base station is provided with dedicated hardware (a plurality of pilot signal receivers) for receiving and processing the pilot signal, where the dedicated hardware has a smaller bandwidth than the regular hardware (a plurality of channel receivers) that is used for communicating with the communication device on a dedicated channel and by use of the array gain provided by the spatial focusing. The reduced bandwidth of the dedicated hardware compared to the regular hardware serves to improve sensitivity to the pilot signal, by increasing the SNR of the analog baseband signals that are generated by the dedicated hardware. Thus, the first aspect facilitates detection of the pilot signal by the base station, and is particularly useful for receiving the pilot signals in absence of array gain (i.e. without spatial beam focus), e.g. by enabling a previously unconnected communication device to be connected to the base station at lower power, thus reducing the level of system interference. Further, the provision of the dedicated hardware with increased sensitivity to pilot signals relaxes the need to increase the transmission power of the communication device when sending a pilot signal to the base station. Thus, the first aspect enables a reduced power consumption of the communication device and is thereby inherently well-suited for communication devices with limited power resources, such as IoT devices.

It is to be understood that the base station may be particularly suitable for communicating with a plurality of communication devices by massive MIMO.

Preferably, the pilot signal receivers and the channel receivers are connected to the antennas in pairs. In other words, each antenna that is connected to a respective one of the pilot signal receivers is also connected to a respective one of the channel receivers. In one embodiment, the number of pilot signal receivers is equal to the number of channel receivers.

In one embodiment, the second bandwidth is less than $1/5$, $1/10$, $1/20$ or $1/50$ of the first bandwidth, and preferably less than $1/100$, $1/200$, $1/500$ or $1/1000$ of the first bandwidth.

In one embodiment, a center frequency of the second bandwidth is located within the first bandwidth.

In one embodiment, the base station further comprises processing circuitry configured to operate on the second analog baseband signals of the plurality of pilot signal receivers to compute channel state information for the RF pilot signal. In one implementation, the base station may be further configured to operate either the channel receivers or the pilot signal receivers to define the spatial beam focus at the communication device or the further communication device that generates the RF pilot signal, based on the channel state information computed for the RF pilot signal. Additionally or alternatively, the processing circuitry may be further configured to intermittently operate on the first analog baseband signals of the plurality of channel receivers to compute the channel state information for the RF transmission signal. Additionally or alternatively, the processing circuitry may be further configured to operate on the first analog baseband signals of the plurality of channel receivers to retrieve payload data encoded in the RF transmission signal.

In one embodiment, the base station is further configured to operate either the channel receivers or the pilot signal receivers to receive a further RF signal generated by the further communication device and convert the further RF signal into corresponding first or second analog baseband signals, wherein the processing circuitry is further configured to operate on the corresponding first or second analog baseband signals to retrieve payload data encoded in the further RF signal.

In one embodiment, the base station further comprises at least one transmitter and is configured to operate the at least one transmitter to send a broadcast signal comprising an indication of a center frequency of the second bandwidth.

In one embodiment, the second bandwidth has a bandwidth in correspondence with the RF pilot signal.

In one embodiment, the respective channel receiver comprises at least one first signal filter that defines the first bandwidth, and the respective pilot signal receiver comprises at least one second signal filter that defines the second bandwidth. In one implementation, the at least one second signal filter is tunable so as to change a center frequency of the second bandwidth.

In one embodiment, the second bandwidth corresponds to a multiple of a smallest bandwidth processed by the channel receiver, said multiple being in the range of 1-100, and preferably in the range of 1-20.

In one embodiment, the RF transmission signal and the RF pilot signal are OFDM signals, and the RF pilot signal consists of 1-12 OFDM sub-carrier signals.

A second aspect of the invention is a method of operating a massive MIMO base station. The method comprises: operating a plurality of channel receivers to wirelessly receive, on a respective antenna, an RF transmission signal generated by a communication device, and to convert the RF transmission signal into first analog baseband signals, by channel front-end modules having a first bandwidth, while collectively operating the channel receivers to define a respective spatial beam focus at the communication device, based on channel state information associated with the communication device. The method further comprises: operating a plurality of pilot signal receivers to wirelessly receive, on a respective antenna, an RF pilot signal generated by the communication device or a further communication device, and to convert the RF pilot signal into second analog baseband signals by pilot signal front-end modules having a second bandwidth which is smaller than the first bandwidth.

The second aspect shares the advantages of the first aspect. Any one of the above-identified embodiments of the first aspect may be adapted and implemented as an embodiment of the second aspect.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Figure 1:
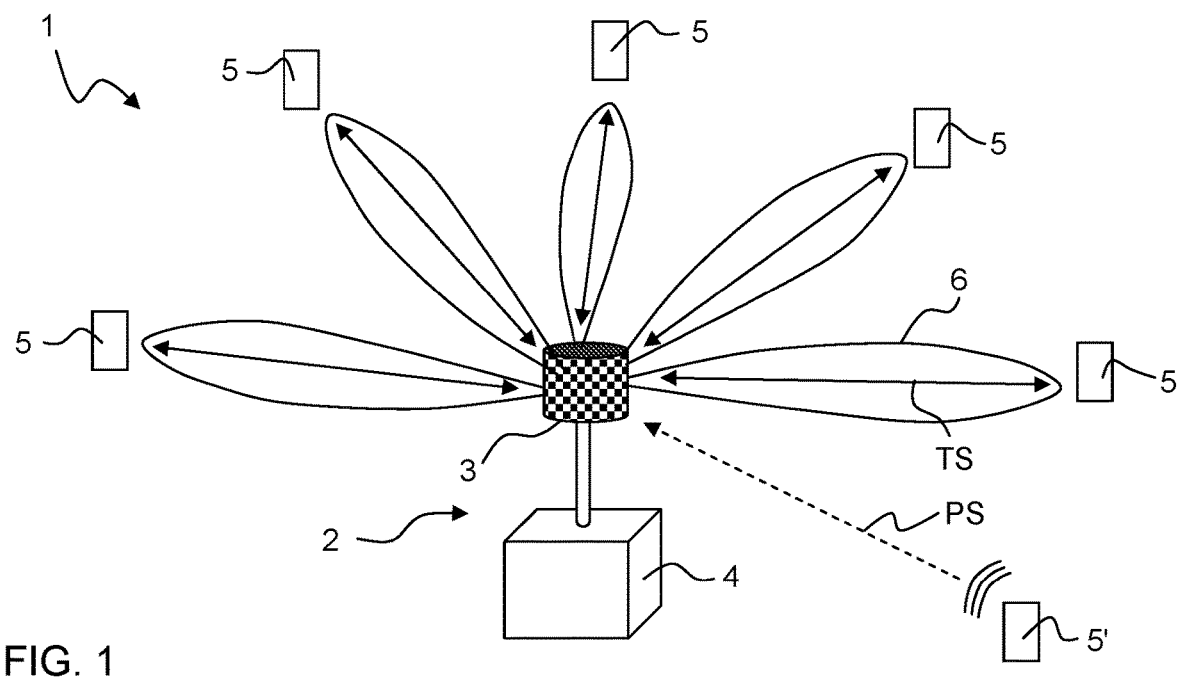
FIG. 1 illustrates an example of a massive MIMO system comprising a base station in which embodiments may be practiced or implemented.

FIG. 1 shows an example of a Massive MIMO (MaMi) system 1 for wireless communication. A base station (BS) 2 is equipped with an array 3 of M active antenna elements or "service antennas" (checkered pattern) and comprises a processing unit 4 configured to communicate wirelessly, via the array 3, with K communication devices (CD) 5 over the same time and frequency band. It should be noted that the configuration of the array 3 in FIG. 1 is merely given as an example. The number M of service antennas may be at least 10, but is typically much larger, such as at least 50, 100 or 250. The number K of CDs 5 that may be serviced by the BS 2 depends on a variety of conditions, such as the system performance metric, propagation environment and coherence block length. In general, M exceeds K by an order of magnitude. The basic principles of MaMi have been described in the Background section and will not be reiterated here.

In FIG. 1, transmission signals communicated to and from the CDs 5 are generally designated by TS. The transmission signals TS include payload data, which is encoded into the transmission signals TS by any suitable technique. In the following, it is assumed that the transmission signals TS, as well all other signals communicated over the air between the BS 2 and the CDs 5 are RF (radio frequency) signals comprising one or more carrier signals that are modulated by any available technique to carry information (digital data).

To communicate the transmission signals TS, the processing unit 4 in the BS 2 is configured to acquire channel state information (CSI) for the transmission paths between the BS 2 and the respective CD 5, for uplink communication (from CD to BS) and downlink communication (from BS to CD), respectively. The processing unit 4 then uses the acquired downlink CSI to generate the outgoing signals for the service antennas such that the resulting transmission signals TS in downlink are spatially focused into a small region in space ("spatial beam focus") at the location of the respective CD 5. This downlink processing is generally denoted "transmit precoding" and various implementations thereof are well-known to the person skilled in the art. Correspondingly, the processing unit 4 uses the acquired uplink CSI to process the incoming signals from the service antennas such that the origin of the transmission signals TS in uplink is spatially focused at the location of the respective CD 5. This uplink processing is generally denoted "receive combining" and various implementations thereof are well-known to the person skilled in the art. In FIG. 1, the spatial focusing of the transmission signals TS in uplink and downlink is schematically represented by radiation lobes 6 in FIG. 1. However, it is important to note that the spatial focusing does not rely on line-of-sight transmission between the BS 2 and the respective CD 5, but rather takes into account multiple propagation paths between the BS 2 and the respective CD 5, including paths that are deflected/scattered one or more times. It should also be understood that the uplink and downlink CSI need to be intermittently updated to account for changes in the propagation paths between the BS 2 and the respective CD 5, so as to maintain the spatial beam focus at the respective CD 5.

As noted in the Background section, MaMi systems may operate by either TDD or FDD and the following description is equally applicable to both. In TDD as well as FDD, the uplink CSI for the respective CD 5 may be estimated by having the CD 5 intermittently send a pilot signal ("uplink pilot"), as part of the transmission signal TS or separate therefrom. The pilot signal is also known as SRS (Sounding Reference Signal) and is a well-defined signal that is known by both the CDs 5 and the BS 2. The pilot signal is designed so that the BS 2 is able to determine the channel transfer function. Hence, the uplink pilot is received by the service antennas of the BS 2 and is analyzed by the processing unit 4 to determine an updated uplink CSI. In TDD, using channel reciprocity, the downlink CSI may be set equal to the uplink CSI, or be calculated by applying predetermined calibration coefficients to the uplink CSI or the uplink pilots as received by the service antennas. In FDD, other processes may be required to determine the downlink CSI, e.g. by the BS 2 sending a pilot signal to the CD 5, which estimates the downlink CSI and sends the downlink CSI back to the BS 2. Various techniques for determining uplink and downlink CSI are well-known to the person skilled in the art.

The spatial focusing results in an array gain, which is proportional to the respective uplink and downlink CSI and the number M of service antennas. By the array gain, the radiated energy-efficiency of the BS 2 and the CDs 5 is increased, making it possible to operate the BS 2 and the CDs 5 with lower energy in the transmission signals TS and in the pilot signals used for determining the updated CSI. Thus, MaMi systems are inherently well-suited for CDs 5 that operate at low power, such as IoT devices.

Details about the theory behind and implementations of MaMi for wireless communication will not be given herein but are readily available in various handbooks and articles, including the articles identified in the Background section, and references cited therein, all of which are incorporated herein by reference.

It is realized that the advantage of low-power operation is generally only available when the BS 2 has acquired the uplink CSI and established the spatial beam focus at the respective CD 5. FIG. 1 illustrates a further CD 5', which is located within range of the BS 2, but for which the BS 2 has no uplink CSI and cannot establish the spatial beam focus. The CD 5' therefore needs to transmit a pilot signal PS for receipt by the array 3 in the absence of spatial focusing. When received, the pilot signal PS allows BS 2 to determine the uplink CSI for CD 5' and establish the spatial beam focus. Embodiments of the invention ensure that the pilot signal PS is detected by the BS 2 even if CD 5' is in or configured for low-power operation. This is achieved by providing the BS 2 with dedicated narrow-band (NB) hardware for detecting the pilot signal PS. It should be understood that CD 5' may be identical to the CDs 5, except for the fact that the BS 2 has not yet established the spatial beam focus with respect to CD 5'. When the spatial beam focus has been established, CD 5' will conceptually be included among the CDs 5.

Figure 2A:
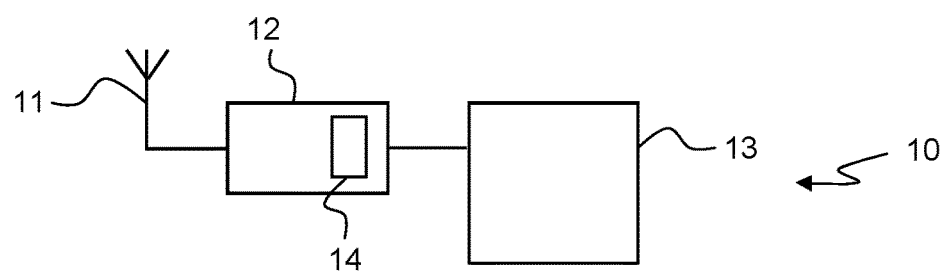
FIG. 2A is a block diagram of a channel receiver in the base station of FIG. 1.

A MaMi base station 2 comprises a plurality of identical channel receivers 10 that are configured to receive the transmission signal TS within a bandwidth that corresponds to a predefined channel in the MaMi system. For example, in the LTE standard, the channel bandwidth may be 1.4, 3, 5, 10, 15 or 20 MHz. FIG. 2A illustrates one such channel receiver 10 which may be included as part of the BS 2 in FIG. 1. The receiver 10 is connected to a service antenna 11 and comprises a front-end module (FEM) 12 and a digital baseband processor 13. The service antenna 11 is included in the array 2 of FIG. 1. The FEM 12 comprises analog and/or digital components and is configured to receive an analog RF signal (e.g. corresponding to the transmission signal TS) from the antenna 11 and translate the analog RF signal to one or more analog baseband signals. The FEM 12 is also known as "RF chain" in the art. The FEM 12 typically includes a combination of filters, low-noise amplifiers (LNAs), and down-conversion mixer(s) needed to process the analog RF signal received at the antenna 11 into the analog baseband signal(s) suitable for input to an analog-to-digital converter (ADC) of the baseband processor 13. The bandwidth of the channel receiver 10 is determined by one or more signal filters 14 within the FEM 12. In all embodiments discussed herein, the FEM 12 may implement any known architecture for translating the analog RF signal to the analog baseband signal(s), including but not limited to a direct conversion architecture and a superheterodyne architecture. In a superheterodyne receiver, the receiver bandwidth is typically set by a band-pass (BP) filter in the FEM 12, and in a direct conversion receiver by a low-pass (LP) filter in the FEM 12. The digital baseband processor 13 is configured to digitize and demodulate the analog baseband signals of all channel receivers 10 so as to retrieve the digital payload data encoded in the analog RF signal. In this process, the digital baseband processor 13 also performs at least part of the coherent processing ("receive combining") for establishing the spatial beam focus. The digital baseband processor 13 also calculates the uplink CSI.

As understood from the foregoing, BS 2 comprises a plurality of channel receivers 10, which are connected to a respective service antenna 11 but may share certain other components. By the channel receivers 10, BS 2 acquires the transmission signals TS within the bandwidth of the channel and separates data streams from the different CDs 5 in the digital domain, by the baseband processor 13.

The BS 2 of FIG. 1 also comprises a plurality of channel transmitters, which may be coupled to dedicated service antennas, or to the same service antennas as the channel receivers 10. The channel transmitters may be configured with a reciprocal structure to the channel receivers 10, so as to perform a reversed signal processing that may include encoding digital payload data into analog baseband signals by use of transmit precoding and converting the analog baseband signals to RF signals for transmission by the service antennas to one or more of the CDs 5.

Embodiments of the invention is based on the insight that the ability of the BS 2 to receive the pilot signal PS from the CD 5', without spatial focusing, and to process this pilot signal PS for channel estimation (i.e. to compute CSI), may be improved by installing a plurality of identical pilot signal receivers (PS receivers) which are designed with a smaller bandwidth than the channel receivers 10. The smaller bandwidth improves the signal-to-noise (SNR) of analog baseband signals that are generated by the PS receivers for input to the digital baseband processor 13. The improved SNR is achieved by the smaller bandwidth resulting in an improved NF (noise figure) of the FEM in the PS receiver.

Embodiments of the invention thereby enable a reduced power consumption of communication devices when connecting to a base station, since the improved SNR allows for detection of PS signals of lower energy. Thereby, embodiments of the invention may be particularly suitable for wireless communication with IoT devices. For example, according to current proposals for 3GPP standards for the Internet of Things, IoT devices are presumed to have a battery life of 10 years with a 5 Wh battery. Thus, IoT devices typically operate at ultra-low power and at low data rates and are likely to support narrowband operation.

Figure 2B:
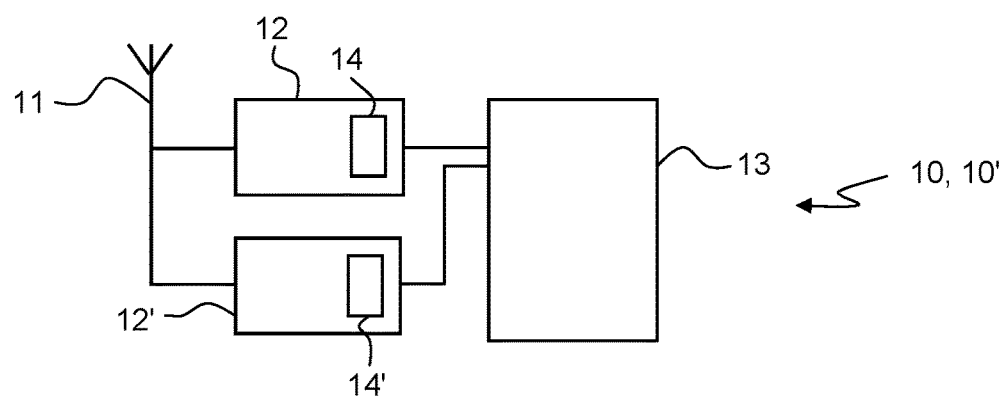
FIG. 2B is block diagram of a combination of a channel receiver and a PS receiver in the base station of FIG. 1.

An embodiment of the PS receiver 10' is shown in FIG. 2B together with a channel receiver 10. The PS receiver 10' is coupled to the same service antenna 11 as the channel receiver 10. The PS receiver 10' comprises an FEM 12' and the baseband processor 13. Like for the channel receiver 10, the baseband processor 13 is common for all PS receivers 10'. The bandwidth of the PS receiver 10' is set by one or more signal filters 14' in the FEM 12'. Except for the signal filter(s), the FEM 12' may be identical to the FEM 12 of the channel receiver 10. Thus, the FEM 12' is configured to receive an analog RF signal (e.g. corresponding to the pilot signal PS) from the antenna 11 and translate the analog RF signal to one or more analog baseband signals. It should be understood that the number of PS receivers 10' may but need not be identical to the number of channel receivers 10.

It should be understood that the PS receiver 10' may share further or other components with the channel receiver 10. A further example will be given below with reference to FIG. 5.

Figure 3:
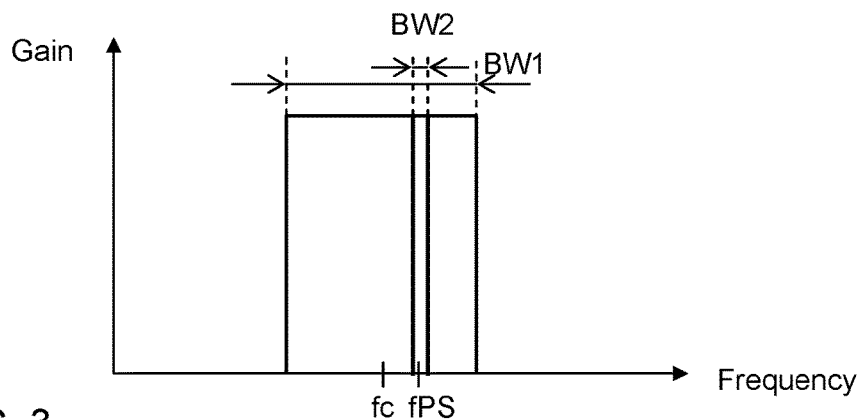
FIG. 3 illustrates bandwidth characteristics of front-end modules in the channel receiver and PS receiver.

The bandwidth of the PS receivers 10' is a fraction of the bandwidth of the channel receivers 10. FIG. 3 shows an example of the transmission characteristics of the channel receivers 10 and the PS receivers 10', with respect to the center carrier frequency fc of the incoming transmission signal TS. FIG. 3 is merely an example, and the gains need not be equal between the channel receivers 10 and the PS receivers 10'. In the illustrated example, the receivers 10, 10' define (by the FEMs 12, 12') a respective bandwidth BW1, BW2 centered on fc and a PS center frequency fPS, respectively. In principle, fPS may be located outside of BW1, but fPS is preferably located within BW1 since this will simplify the design of the FEMs 12, 12', e.g. by allowing them to partly use common components, and also the design of the CDs 5, 5', e.g. by reducing the need to add dedicated hardware for generating the pilot signal PS in addition to the transmission signals TS. The relation between BW2 and BW1 is selected based on the desired SNR improvement to be achieved for the pilot signal PS. It is currently believed that the ratio BW2/BW1 should be less than about ⅕. In some implementations, the ratio BW2/BW1 may be less than about 1/100 or even less than about 1/1000. In one particular embodiment, BW2 is a multiple N of the smallest bandwidth that is processed by the channel receivers 10, with N being in the range of 1-100 or 1-50. Such a smallest bandwidth is generally predefined for all wireless communication protocols. For example, if the digital payload data is encoded in the RF signal by OFDM as used in LTE (see below), the smallest bandwidth corresponds to the bandwidth of a single sub-carrier frequency, also known as an OFDM tone. By defining BW2 to match a multiple of the smallest bandwidth, it is possible to use the same or similar baseband processing for both the PS receivers 10' and the channel receivers 10.

As understood from the foregoing, BS 2 is configured to receive and process the pilot signal PS by the PS receivers 10' so as to allow the baseband processor 13 to determine the uplink CSI for CD 5' based on the pilot signal PS. It is understood that the pilot signal PS is generated by CD 5' to fall within the frequency range of BW2. Preferably, the pilot signal PS has a bandwidth that is equal to or smaller than BW2, to maximize the transmission efficiency of the pilot signal PS.

CD 5' may be preconfigured to generate the pilot signal PS at one or more predefined frequencies, one of which falls within the frequency range of BW2. In an alternative, BS 2 may be configured to intermittently transmit a broadcast signal, which is thus transmitted without spatial focusing for interception by CD 5', and possibly also the CDs 5. To compensate for the lack of spatial focusing, the broadcast signal may be transmitted with an elevated power. The broadcast signal indicates a required center frequency for the pilot signal PS (i.e. fPS). Depending on implementation, the broadcast signal may also include scheduling information, i.e. one or more time points for transmission of the pilot signal PS. The broadcast signal may also indicate a specific type or class of communication devices for which the broadcast signal is intended. The broadcast signal may thus cause the CD 5', if belonging to the intended type/class, to transmit the pilot signal PS at the required frequency at the required time point(s).

In a further embodiment (not shown), BS 2 includes more than one set of PS receivers 10'. The different sets of PS receivers 10' may have different center frequencies fPS with non-overlapping BW1 between the different sets. Such an embodiment will increase the ability of BS 2 to handle simultaneous pilot signals PS from plural CDs 5'. It may also provide a simple way for BS 2 to distinguish between different types/classes of communication devices, if each class is preconfigured or instructed by the broadcast signal to transmit the pilot signal PS on a respective center frequency fPS. The number of different sets is preferably kept low, e.g. to 2-5, since each additional set of PS receivers 10' will add cost and complexity to BS 2. In an alternative embodiment, the filter(s) 14' in the respective FEM 12' (FIGS. 2B-2C) is tunable to allow the center frequency fPS of the PS receivers 10' to be changed. This allows a single set of PS receivers 10' to sequentially operate a plurality of different center frequencies fPS. Thereby, BS 2 may operate a single set of PS receivers 10' to scan a selected number of center frequencies fPS for presence of further CDs 5'.

After BS 2 has determined the uplink CSI based on the pilot signal PS, and enabled the spatial focusing at CD 5' (which is thereby included among the CDs 5 in FIG. 1), CD 5' may operate in different ways to send a transmission signal with payload data to the BS 2. In a first implementation, CD 5' generates the transmission signal with a center frequency on or near fPS and a bandwidth that falls within BW2, and BS 2 retrieves the payload data by operating the PS receivers 10' to establish the spatial beam focus. It should be noted that CD 5' may set the bandwidth of the transmission signal to exceed the bandwidth of the pilot signal PS to increase the data transmission rate. However, to maintain the spatial beam focus, the frequencies of the transmission signal should fall within the coherence bandwidth of the pilot signal PS. Furthermore, if the bandwidth of the transmission signal exceeds the bandwidth of the pilot signal PS, BS 2 may apply predetermined calibration data to adapt the uplink CSI accordingly (which has been determined for the more narrowband pilot signal PS). In a second implementation, CD 5' generates the transmission signal with a center frequency on or near fPS of the pilot signal PS and a bandwidth that falls outside BW2 but within BW1, and BS 2 retrieves the payload data by operating the channel receivers 10' to establish the spatial beam focus. Like in the first implementation, the frequencies of the transmission signal should fall within the coherence bandwidth of the pilot signal PS.

Figures 4A, 4B:
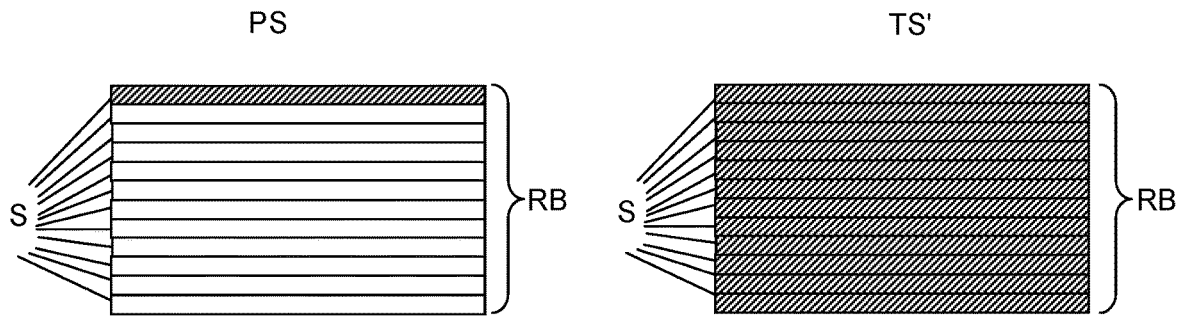
FIGS. 4A-4B illustrate an example of pilot and payload transmission from a communication device using OFDM modulation.

FIGS. 4A-4B illustrate the pilot signal PS and the subsequent transmission signal (designated by TS') as signals generated by OFDM (Orthogonal Frequency-Division Multiplexing), e.g. as used in LTE, WIMAX and Wi-Fi. In LTE, each channel is divided into a number of resource blocks (RB), each comprising 12 sub-carriers with a respective bandwidth of 15 kHz. In the example of FIG. 4A, CD 5' generates the pilot signal PS on one of sub-carriers S (dark in FIG. 4A) within a resource block RB, i.e. with a bandwidth of 15 kHz. Then, when BS 2 has established the uplink CSI based on the pilot signal PS, CD 5' transmits payload data on the transmission signal TS' consisting of all of the 12 sub-carriers S (dark in FIG. 4B) within the resource block RB, i.e. with a bandwidth of 180 kHz. In the LTE standard, a resource block RB falls within the coherence bandwidth. If BW2>180 kHz, BS 2 may be configured to operate the PS receivers 10' to establish the spatial beam focus for receiving and decoding the payload data. If BW2<180 kHz, e.g. 15 kHz, BS 2 may instead be configured to operate the channel receivers 10 to establish the spatial beam focus for receiving and decoding the payload data.

Figure 5:
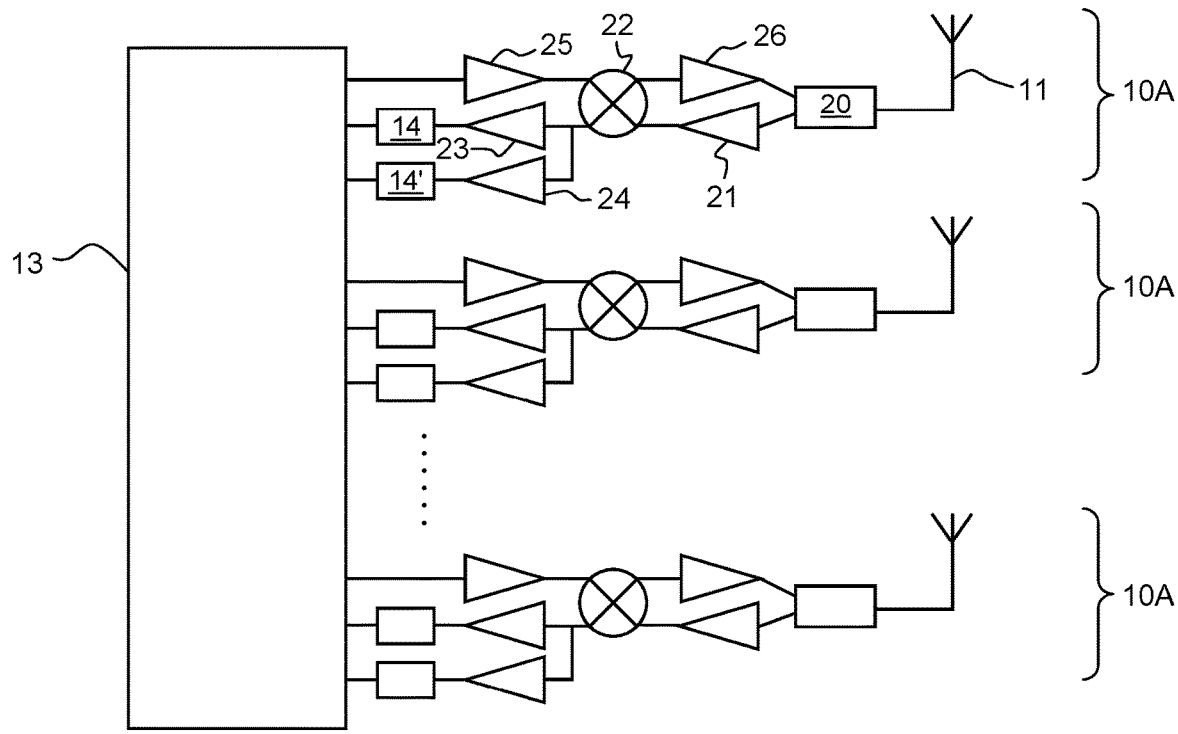
FIG. 5 is a block diagram of a massive MIMO base station in one embodiment.

FIG. 5 is a block diagram of an example implementation of a set of transceivers 10A for the BS 2 in FIG. 1, where each transceiver 10A comprises a plurality of components or component blocks that collectively define a channel receiver, a PS receiver, and a channel transmitter. In the illustrated example, components are shared between the channel receiver, the PS receiver, and the channel transmitter. Each channel receiver is coupled to a respective antenna 11 and comprises a bandpass filter (BPF) 20, a low noise amplifier (LNA) 21, a mixer 22, an amplifier 23, and a filter 14 that defines the bandwidth BW1 of the channel receiver. The PS receivers are also coupled to the antennas 11, and each PS receiver comprises the BPF 20, the LNA 21, the mixer 22, an amplifier 24, and a filter 14' that defines the bandwidth BW2 of the PS receiver. In the illustrated example, the channel transmitters are also coupled to the antennas 11, and each channel transmitter comprises an amplifier 25, the mixer 22, a high power amplifier (HPA) 26, and the BPF 20. The components located between the antenna 11 and the baseband processor 13 in FIG. 5 define the FEMs 12, 12' shown in FIG. 2B, as well as a corresponding FEM of the channel transmitter. The baseband processor 13 is also part of the set of transceivers 10A and is configured to encode payload data into digital baseband signals which are converted into analog baseband signals for the FEMs of the channel transmitters, and decode digital payload data from the analog baseband signals from the FEMs of the channel receivers and the PS receivers. In these processes, the baseband processor 13 performs receive combining and transmit precoding to establish the spatial beam focus at the respective communication device.

Embodiments of the invention may be applied to improve any existing wireless communication standard suitable for MaMi, including but not limited to Wi-Fi (e.g. according to IEEE 802.11), 3G (e.g. according to UMTS, CDMA2000 or HSPA), and 4G (e.g. according to WiMAX, LTE or LTE-Advanced). These and other existing communication standards typically operate in the frequency range of 0.4-6 GHz. The inventive technique is equally applicable to future communication standards in this frequency range or other frequency ranges, such as 30-300 GHz (mmWave). The channel receivers may be configured with a bandwidth BW1 that matches any channel bandwidth set by these communication standards. Typically, the channel bandwidth is in the range of 1-30 MHz. For example, Wi-Fi defines a 22 MHz channel, LTE defines 1.4 MHz, 3 MHz, 5 MHz, 10 MHz, 15 MHz, 20 MHz channels, HSPA defines a 5 MHz channel, and WIMAX typically operates with channel bandwidths of 1.25 MHz, 3.5 MHz, 5 MHz, 7 MHz, 8.75 MHz and 10 MHz.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, BS 2 may be configured to selectively control the channel receivers 10 and the PS receivers 10' such that pilot signals from certain communication devices (e.g. low-power devices such as IoT devices) are received, in absence of array gain, by the PS receivers 10', whereas pilot signals from other communication devices (e.g. higher-power devices such as mobile handsets or computers) are received, in absence of array gain, by the channel receivers 10.

Further, BS 2 may be configured to communicate with a single communication device 5.

The invention claimed is:
1. A base station, comprising:
 a plurality of antennas,
 a plurality of channel receivers, wherein each channel receiver is connected to one respective antenna among the plurality of antennas to wirelessly receive an RF transmission signal generated by a communication device, wherein each channel receiver comprises a channel front-end module, which has a first bandwidth and is configured to convert the RF transmission signal into one or more first analog baseband signals, wherein the channel receivers are collectively operable to define a spatial beam focus at the communication device, based on channel state information associated with the communication device, and
 a plurality of pilot signal receivers, wherein each pilot signal receiver is connected as a pair with a respective channel receiver to a respective antenna among the plurality of antennas to wirelessly receive an RF pilot signal generated by the communication device or a further communication device, wherein each pilot signal receiver comprises a pilot signal front-end module, which has a second bandwidth that is smaller than the first bandwidth and which is configured to convert the RF pilot signal into one or more second analog baseband signals.

2. The base station of claim 1, wherein the second bandwidth is less than $1/5$, $1/10$, $1/20$ or $1/50$ of the first bandwidth, and preferably less than $1/100$, $1/200$, $1/500$ or $1/1000$ of the first bandwidth.

3. The base station of claim 1, wherein a center frequency of the second bandwidth is located within the first bandwidth.

4. The base station of claim 1, further comprising processing circuitry configured to operate on the second analog baseband signals of the plurality of pilot signal receivers to compute channel state information for the RF pilot signal.

5. The base station of claim 4, which is further configured to operate either the channel receivers or the pilot signal receivers to define the spatial beam focus at the communication device or the further communication device that generates the RF pilot signal, based on the channel state information computed for the RF pilot signal.

6. The base station of claim 4, wherein the processing circuitry is further configured to intermittently operate on the first analog baseband signals of the plurality of channel receivers to compute the channel state information for the RF transmission signal.

7. The base station of claim 4, wherein the processing circuitry is further configured to operate on the first analog baseband signals of the plurality of channel receivers to retrieve payload data encoded in the RF transmission signal.

8. The base station of claim 4, which is further configured to operate either the channel receivers or the pilot signal receivers to receive a further RF signal generated by the further communication device and convert the further RF signal into corresponding first or second analog baseband signals, wherein the processing circuitry is further configured to operate on the corresponding first or second analog baseband signals to retrieve payload data encoded in the further RF signal.

9. The base station of claim 1, which further comprises at least one transmitter and is configured to operate the at least one transmitter to send a broadcast signal comprising an indication of a center frequency of the second bandwidth.

10. The base station of claim 1, wherein the second bandwidth has a bandwidth in correspondence with the RF pilot signal.

11. The base station of claim 1, wherein the respective channel receiver comprises at least one first signal filter that defines the first bandwidth, and the respective pilot signal receiver comprises at least one second signal filter that defines the second bandwidth.

12. The base station of claim 11, wherein the at least one second signal filter is tunable so as to change a center frequency of the second bandwidth.

13. The base station of claim 1, wherein the second bandwidth corresponds to a multiple of a smallest bandwidth processed by the channel receiver, said multiple being in the range of 1-100, and preferably in the range of 1-20.

14. The base station of claim 1, wherein the RF transmission signal and the RF pilot signal are OFDM signals, and wherein the RF pilot signal consists of 1-12 OFDM sub-carrier signals.

15. A method of operating a base station, comprising:
  operating a plurality of channel receivers, each of which is respectively connected to one antenna of a plurality of antennas, to wirelessly receive, on a respective antenna, an RF transmission signal generated by a communication device, and to convert the RF transmission signal into first analog baseband signals, by channel front-end modules having a first bandwidth, while collectively operating the channel receivers to define a respective spatial beam focus at the communication device, based on channel state information associated with the communication device, and
  operating a plurality of pilot signal receivers, respectively connected as pairs with respective channel receivers to the plurality of antennas, to wirelessly receive, on a respective antenna, an RF pilot signal generated by the communication device or a further communication device, and to convert the RF pilot signal into second analog baseband signals by pilot signal front-end modules having a second bandwidth which is smaller than the first bandwidth.

* * * * *